(12) United States Patent
Klein (10) Patent No.: US 9,891,693 B1
(45) Date of Patent: Feb. 13, 2018

(54) STORAGE SYSTEM COMPRISING A COMMUNICATIONS PORT FOR CHARGING AN ELECTRONIC DEVICE

(71) Applicant: Western Digital Technologies, Inc., Irvine, CA (US)

(72) Inventor: Barry L. Klein, Trabuco Canyon, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 311 days.

(21) Appl. No.: 13/902,722

(22) Filed: May 24, 2013

Related U.S. Application Data (60) Provisional application No. 61/812,952, filed on Apr. 17, 2013.

(51) Int. Cl.
*G06F 1/32* (2006.01)

(52) U.S. Cl.
CPC .................... *G06F 1/3268* (2013.01)

(58) Field of Classification Search
CPC ........ G06F 3/067; G06F 1/266; G06F 1/3268; H02J 2007/0062
See application file for complete search history.

(56) References Cited

U.S. PATENT DOCUMENTS

| | | | |
|---|---|---|---|
| 7,631,111 B2 | 12/2009 | Monks et al. | |
| 8,010,728 B1 | 8/2011 | Grady et al. | |
| 8,862,921 B1* | 10/2014 | Kim et al. | 713/323 |
| 2003/0065497 A1* | 4/2003 | Rhoads | 703/18 |
| 2004/0251878 A1* | 12/2004 | Veselic | 320/141 |
| 2005/0235337 A1* | 10/2005 | Wilson et al. | 725/134 |
| 2009/0024860 A1* | 1/2009 | Krishnamoorthy | G11B 25/043 713/323 |
| 2010/0045243 A1* | 2/2010 | Mizuno et al. | 320/162 |
| 2010/0070659 A1* | 3/2010 | Ma et al. | 710/14 |

(Continued)

OTHER PUBLICATIONS

Texas Instruments User's Guide, "Using the TPS2511EVM-141", Literature No. SLUU945, Jun. 2012, webpage printed out from <http://www.ti.com/lit/ug/sluu945/sluu945.pdf> on May 24, 2013 (16 pages).

(Continued)

*Primary Examiner* — Thomas Lee
*Assistant Examiner* — Gary Collins
(74) *Attorney, Agent, or Firm* — Chang & Hale LLP (57) ABSTRACT

A storage system including a storage device comprising a media configured to store data, wherein the storage device is configured to be in a first operating mode or a second operating mode comprising a reduced power mode relative to the first operating mode, a communications port configured to connect to an electronic device, the communications port comprising one or more data lines configured to communicate data to the electronic device and to configure power supplied to the electronic device, and one or more controllers. The one or more controllers are configured to control an operation of the storage device, communicate data to the electronic device using the one or more data lines when the storage device is in the first operating mode, and configure power supplied to the electronic device using the one or more data lines when the storage device is in the second operating mode.

31 Claims, 7 Drawing Sheets

(56) References Cited

U.S. PATENT DOCUMENTS

| | | | |
|---|---|---|---|
| 2010/0219790 A1* | 9/2010 | Chadbourne | G06F 1/266 |
| | | | 320/107 |
| 2012/0330888 A1 | 12/2012 | Cruz | |
| 2013/0013904 A1 | 1/2013 | Tran | |
| 2013/0154551 A1* | 6/2013 | Jeansonne et al. | 320/107 |
| 2016/0054786 A1* | 2/2016 | Chenault | G06F 1/3287 |
| | | | 710/313 |

OTHER PUBLICATIONS

Pericom, P15USB2543, "USB Power Switch with Pericom's FAST Charger Circuitry for DCP, CDP, and 2A iPad support", Feb. 14, 2013, webpage printed out from <http://www.pericom.com/assets/Datasheets/PI5USB2543.pdf> on May 24, 2013 (11 pages).
Pericom, P15USB2543—Phone Charging Device List, "Phone List", Nov. 20, 2012 (3 pages).

\* cited by examiner

STORAGE SYSTEM COMPRISING A COMMUNICATIONS PORT FOR CHARGING AN ELECTRONIC DEVICE

CROSS-REFERENCE TO RELATED APPLICATIONS

This application claims the benefit of U.S. Provisional Application No. 61/812,952, filed on Apr. 17, 2013, entitled "STORAGE SYSTEM COMPRISING A COMMUNICATIONS PORT FOR CHARGING AN ELECTRONIC DEVICE," which is hereby incorporated by reference in its entirety.

BACKGROUND

Conventionally, an electronic device is charged by plugging a cable to a wall outlet. However, the number of wall outlets available and the location of such wall outlets may be limited in a household. Thus, a user may need to use a longer than normal cable in order to charge the electronic device. However, such longer cables are often not included with the electronic device. Thus, the user may have to purchase an additional cable, which can be even more expensive than a normal cable. Such longer cables could also provide additional portions of the cable which may be caught on by an object or a person.

In addition, even if the wall outlet was accessible for the cable, the wall outlet may have a limited amount of sockets. With the increasing number of electronic devices in the household, the sockets may already be used. A power strip may be used, but the number of electronic devices used in the household may be numerous enough such that some or all of the sockets of a power strip may also be used.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
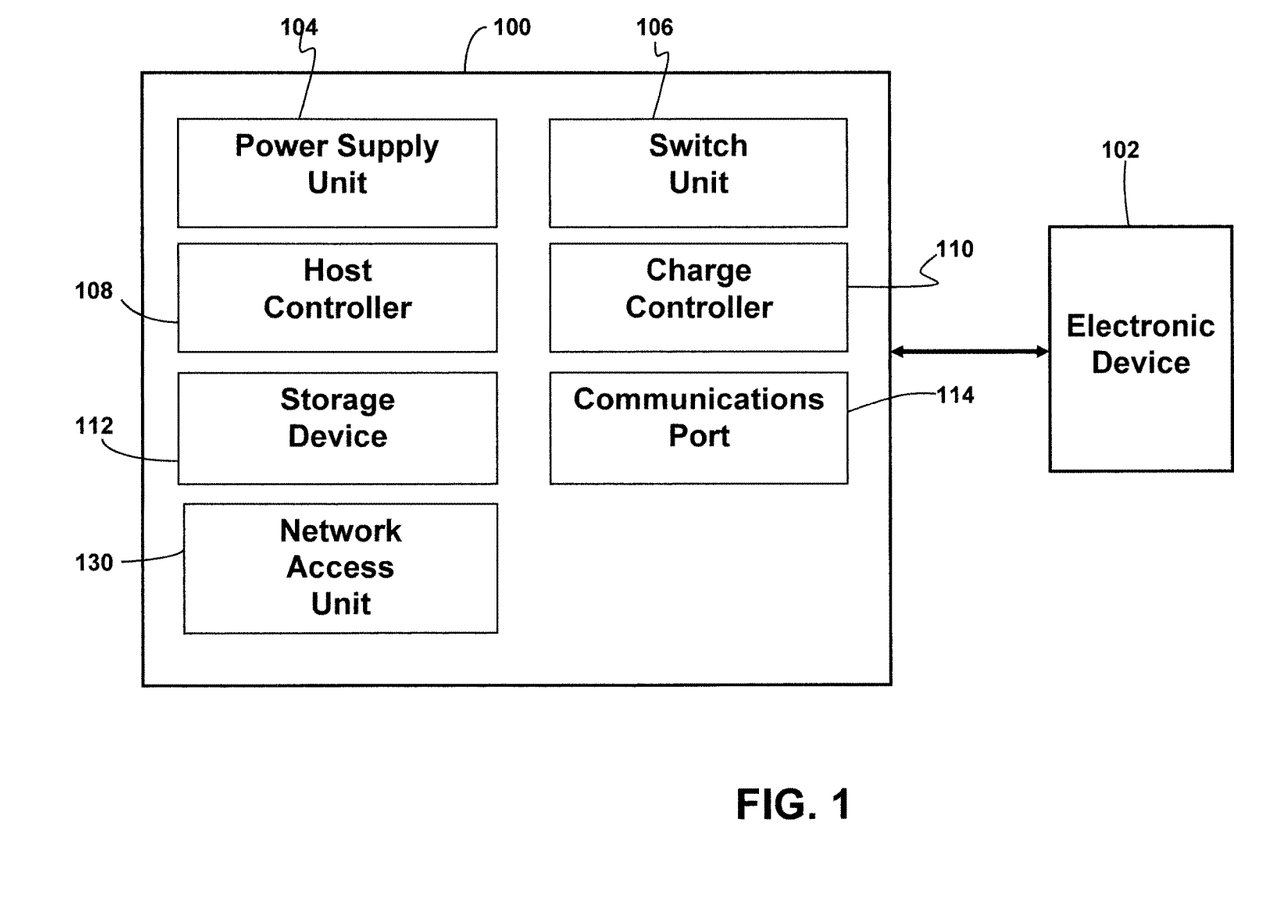
FIG. 1 is a box diagram of a storage system configured to be connected to an electronic device according to an embodiment.

In an embodiment shown in FIG. 1, a storage system 100 is configured to be connected to an electronic device 102. In an embodiment, the storage system 100 comprises a power supply unit 104, a switch unit 106, a host controller 108, a charge controller 110, a storage device 112, a communications port 114, and a network access unit 130. In an embodiment, the storage system 100 comprises a network attached storage system, a media streaming device, a cable box, or any combination thereof.

In an embodiment, the storage system 100 is configured to be connected to the electronic device 102 using the communications port 114. In an embodiment, the storage system 100 is configured to charge the electronic device 102, communicate data to the electronic device 102, or any combination thereof. For example, the communications port 114 can comprise one or more data lines configured to communicate data to the electronic device and to configure power supplied to the electronic device. In an embodiment, the electronic device 102 comprises a mobile phone, a laptop, a tablet, a pad, a portable gaming device, a portable music device, a watch, or other device which may be connected to and charged by the storage system 100.

In an embodiment, the amount of power supplied by the storage system 100 can be varied, which will be described in more detail below. The data communicated to the electronic device 102 can be, for example, data stored on the storage device 112. In an embodiment, the storage device 112 comprises at least one of a magnetic recording disk or a solid state memory. In an embodiment, the data can be, for example, photo data, music data, video data, or any combination thereof.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Furthermore, in an embodiment, the storage device 112 is configured to operate in a first operating mode or a second operating mode. In an embodiment, the first operating mode is a default mode or a normal operating mode. In an embodiment, the second operating mode comprises a reduced power mode relative to the first operating mode. Thus, the storage device 112 can consume less power when the storage device 112 is in the second operating mode. For example, the storage device 112 may be configured to consume a first amount of power when the storage device 112 is in the first operating mode, and a second amount of power when the storage device 112 is in the second operating mode. The second amount of power can be less than the first amount of power.

In an embodiment, when the storage device 112 is in the second operating mode, the storage device 112 is in a standby mode or an off mode. In an embodiment, during a standby mode or an off mode, the storage device 112 may be spun-down when the storage device 112 comprises the magnetic recording disk (e.g., a hard disk drive, hybrid drive or other mechanical drive). When spun down, most or all of the mechanical components of a mechanical drive are generally not moving, which can significantly reduce the power usage of the mechanical drive.

In an embodiment, the power supply unit 104 is configured to supply power to the storage device 112 and to charge the electronic device 102. The amount of power supplied to the storage device 112 and to charge the electronic device 102 can be varied, which will be described in more detail later. In an embodiment, the power supply unit 104 is configured to supply at least 500 mA to the electronic device 102. In an embodiment, the power supply unit 104 is configured to supply at least 900 mA to the electronic device 102.

In an embodiment, the power supply unit 104 comprises a DC to DC converter. In an embodiment, the power supply unit 104 comprises a power input. The power input can be configured, for example, to be connected to external power sources. The external power sources can be, for example, a wall outlet, an automobile power outlet, an airplane power outlet, a generator, a battery, or other type of power source which may provide sufficient power to power the storage system 100.

In an embodiment, the network access unit 130 is configured to be connected to a network and to provide network access to the storage device 112. In an embodiment, the network access unit 130 comprises a network interface controller, a wireless network card, a wireless access device, a device capable of accessing a network, or any combination thereof. In an embodiment, the network access unit 130 is configured to receive a request from the network to place the storage device in the second operating mode, and to receive a request from the network to access the storage device.

In an embodiment, the host controller 108 is configured to control an operation of the storage device 112. The host controller 108 can be, for example, an application specific integrated circuit ("ASIC") host controller. The host controller 108 can also be configured to communicate data to the electronic device using the one or more data lines when the storage device 112 is in the first operating mode. Furthermore, the host controller 108 can also be configured to control the switch unit 106. The switch unit 106 is configured to switch a connection of the one or more data lines between the host controller 108 and the charge controller 110, which will be described in more detail below. In an embodiment, the charge controller 110 is configured to configure power supplied to the electronic device 102 using the one or more data lines when the storage device 112 is in the second operating mode.

Figure 2:
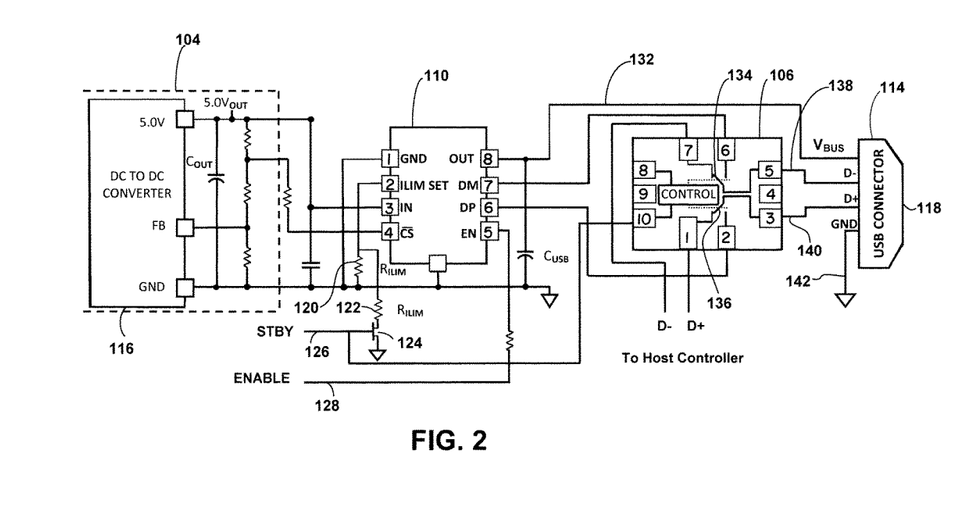
FIG. 2 is a circuit diagram of a portion of a storage system according to an embodiment.

In an embodiment, a circuit diagram of portions of the storage system 100 is shown in FIG. 2. As previously noted, the power supply unit 104 comprises a DC to DC converter 116. The power supply unit 104 can be connected, for example, to an external power source. The communications port 114 is configured to be connected to the electronic device 102 (FIG. 1). In the embodiment shown in FIG. 2, the communications port 114 comprises a universal serial bus ("USB") connector 118. However, the communications port 114 could utilize other types of connectors and other types of standards for connection with the electronic device 102. In an embodiment, an output current from the communications port 114 comprises a minimum output current required to satisfy various communications standards such as a USB 3.0 standard. In an embodiment, the communications port 114 comprises a ground line 142, a power line 132, and data lines 138 and 140. In an embodiment, the data line 138 comprises a data minus line and the data line 140 comprises a data plus line.

In an embodiment, the power supply unit 104 transmits power to the electronic device 102 using the power line 132. As can be seen in the embodiment shown in FIG. 2, the amount of power supplied to the communications port 114 and the electronic device 102 is based on a resistance of the resistors 120 and 122 ($R_{ILIM}$). Since the resistors 120 and 122 are in parallel, changes in resistance to one or more of the resistors 120 and 122 can affect an amount of power supplied by the power supply unit 104 in the power line 132. In an embodiment, the resistance of the resistor 122 can be adjusted by a field-effect transistor (FET) 124. The FET 124 can decrease the resistance of the resistor 122 in order to increase the power supplied by the power supply unit 104 in the power line 132.

In an embodiment, the operation of the FET 124 is controlled by a STANDBY ("STDBY") signal at a STDBY signal line 126. When the STDBY signal is enabled, the FET 124 can decrease the resistance of the resistor 122 to thereby increase the power supplied by the power supply unit 104 in the power line 132. When the STDBY signal is disabled, the FET 124 can increase the resistance of the resistor 122 to thereby decrease the power supplied by the power supply unit 104 in the power line 132. In an embodiment, the role of the STDBY signal can also be reserved such that the when the STDBY signal is enabled, the FET 124 can increase the resistance of the resistor 122, and when the STDBY signal is disabled, the FET 124 can decrease the resistance of the resistor 122. In an embodiment, the STDBY signal is transmitted, asserted, enabled, or disabled by the host controller 108. In an embodiment, the STDBY signal indicates when the storage device 112 is in the second operating mode.

As seen in the embodiment shown in FIG. 2, the switch unit 106 is configured to switch a connection of the data lines 138 and 140 between the charge controller 110 and the host controller 108. In the embodiment shown in FIG. 2, the switch unit 106 comprises a double pole, double throw switch.

Figure 3:
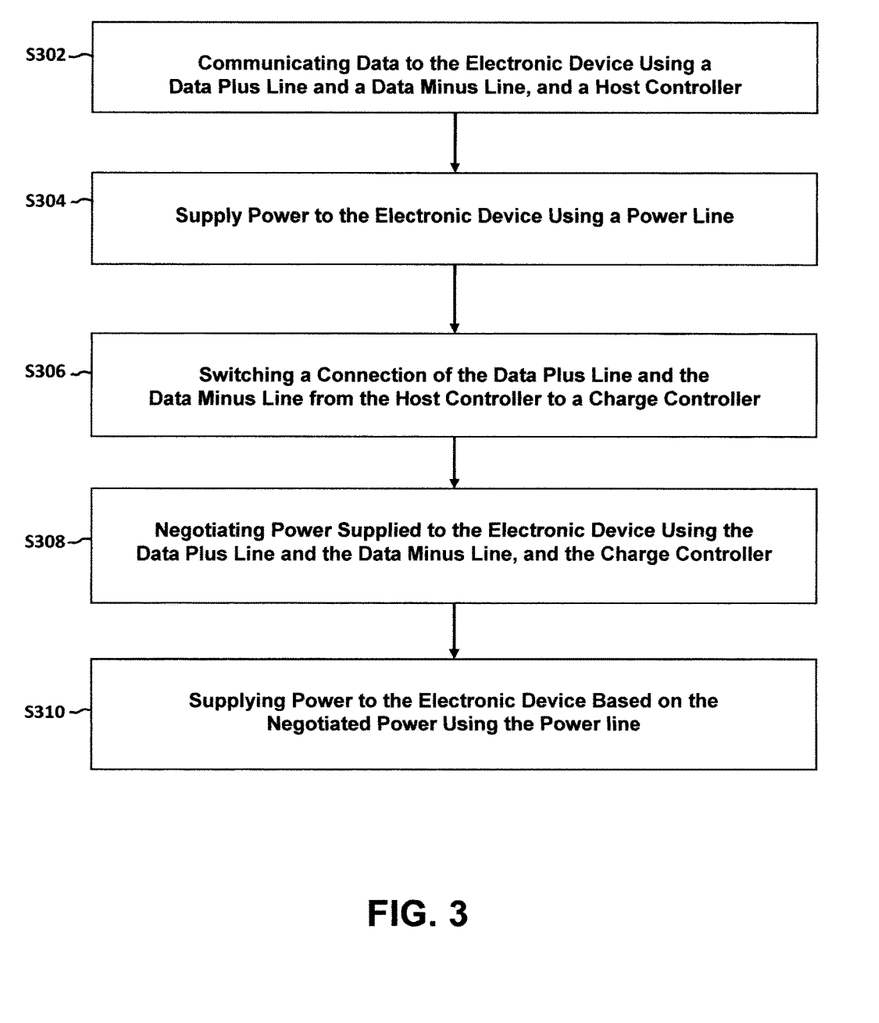
FIG. 3 depicts a process for communicating data and supplying power to an electronic device according to an embodiment.

In an embodiment shown in FIG. 3, a process for switching a connection of the data lines 138 and 140 between the charge controller 110 and the host controller 108 is disclosed. In block S302, the host controller 108 communicates data to the electronic device 102 using the data lines 138 and 140. In block S304, the power supply unit 104 supplies power to the electronic device 102 using the power line 132. In an embodiment, the power supply unit 104 supplies power to the electronic device 102 using the power line 132. For example, the power supply unit 104 can supply approximately 500 mA of power to the electronic device using the power line 132.

In block S306, the switch unit 106 switches a connection of the data lines 138 and 140 from the host controller 108 to the charge controller 110. For example, the switch unit 106 comprises connection units 134 and 136. The data line 138 is connected to a pin 5 of the switch unit 106 while the data line 140 is connected to a pin 3 of the switch unit 106. In the embodiment shown in FIG. 2, the pin 5 of the switch unit 106 is connected to either a pin 6 of the switch unit 106, or a pin 7 of the switch unit 106, depending on a position of the connection unit 134. Furthermore, in the embodiment shown in FIG. 2, the pin 3 of the switch unit 106 is connected to either a pin 2 of the switch unit 106, or a pin 1 of the switch unit 106, depending on a position of the connection unit 134.

When the pin 5 of the switch unit 106 is connected to the pin 7 of the switch unit 106, the data line 138 is connected to the host controller 108. When the pin 3 of the switch unit 106 is connected to the pin 1 of the switch unit 106, the data line 140 is connected to the host controller 108. However, when the pin 5 of the switch unit 106 is connected to the pin 6 of the switch unit 106, the data line 138 is connected to a pin 7 of charge controller 110. Similarly, when the pin 3 of the switch unit 106 is connected to the pin 2 of the switch unit 106, the data line 140 is connected to a pin 6 of the charge controller 110.

In an embodiment, the host controller 108 controls the operation of the switch unit 106. Therefore, the host controller 108 controls when the connection unit 134 switches the connection of the pin 5 of the switch unit 106 between the pin 6 of the switch unit 106 and the pin 7 of the switch unit 106. The host controller 108 also controls when the connection unit 136 switches the connection of the pin 3 of the switch unit 106 between the pin 2 of the switch unit 106 and the pin 1 of the switch unit 106. In an embodiment, the host controller 108 controls the operation of the switch unit 106 by transmitting, asserting, enabling, or disabling the STDBY signal on the STDBY signal line 126 as shown in the embodiment in FIG. 2.

Thus, in block S306, the connection unit 134 switches the connection of the pin 5 of the switch unit 106 from the pin 7 of the switch unit 106 to the pin 6 of the switch unit 106. Similarly, the connection unit 136 switches the connection of the pin 3 of the switch unit 106 from the pin 1 of the switch unit 106 to the pin 2 of the switch unit 106. Therefore, the data lines 138 and 140 are switched from being connected to the host controller 108 to being connected to the charge controller 110.

In block S308 the charge controller 110 negotiates power supplied to the electronic device 102 using the data lines 138 and 140. For example, the charge controller 110 can communicate with the electronic device 102 regarding what amount of power the electronic device 102 requests from the storage system 100 and what amount of power the storage system 100 can or will supply to the electronic device 102. The charge controller 110 can also communicate with the electronic device 102 to determine if the charge controller 110 should even supply power to the electronic device 102.

For example, the power supply unit 104 may supply 0.5 mA of power to the electronic device 102. However, the electronic device 102 may send a request to the charge controller 110 requesting 2.0 A of power. In response to the request for additional power, the charge controller 110 may indicate that the power supplied by the power supply unit 104 to the electronic device 102 will be increased to the requested 2.0 A of power.

However, the electronic device 102 may send a request to the charge controller 110 requesting 3.5 A of power, but the power supply unit 104 may only be able to supply 2.0 A of power to the electronic device 102. In such a case, the charge controller 110 may indicate that the power supply unit 104 may supply only 2.0 A of power. In other instances, the electronic device 102 may send a message to the charge controller 110 to decline the 2.0 A of power as being insufficient. Instead, the electronic device 102 may send a message to the charge controller 110 to choose to receive no power or an even a reduced amount of power. Although specific amounts of power are disclosed above, it should be understood that such numbers are merely presented as examples, and other amounts of power may be utilized.

In block S310, power is supplied to the electronic device 102 based on the negotiated power using the power line 132. In an embodiment, the amount of power supplied by the power supply unit 104 may vary from electronic device to electronic device. In an embodiment, the charge controller 110 boosts the power supplied to the electronic device 102 by boosting an output of the $\overline{CS}$ signal coming from pin 4 of the charge controller 110. In the embodiment shown in FIG. 2, the $\overline{CS}$ signal in the pin 4 feeds into a feedback sense of the power supply unit 104. In an embodiment, the increased amount of power supplied to the electronic device 102 occurs when the storage device 112 is in the second operating mode.

Thus, in an embodiment, the reduced power consumption by the storage device 112 in the second operating mode can allow the electronic device 102 to receive additional power. That is, since the storage device 112 consumes less power in the second operating mode, some or all of the power which may have been used to power the storage device 112 in the first operating mode is supplied instead to the electronic device 102. In an embodiment, some or all of a power differential between the first amount of power and the second amount of power is supplied to the electronic device 102 when the storage device 112 is in the second operating mode. In an embodiment, this may allow charging of the electronic device 102 even in some situations where a low-power power supply unit is used. For example, the power supply unit 104 may be insufficient to charge the electronic device 102 at an amount of power requested by the electronic device 102, and power the storage device 112 when the storage device 112 is in the first operating mode. However, when the storage device 112 is in the second operating mode, power may be freed up to charge the electronic device 102 at the amount of power requested by the electronic device 102 or at least increase an amount of power supplied to the electronic device 102.

Furthermore, in an embodiment, the output of the $\overline{CS}$ signal in the pin 4 can also be used to boost power supplied by the power supply unit 104 to overcome current and/or voltage loss by a cable connected between the storage system 100 and the electronic device 102. In an embodiment, the current and/or voltage loss can be an IV loss.

In an embodiment, the charge controller 110 also provides a hiccup recovery. That is, the charge controller 110 can automatically prevent power from reaching the electronic device 102 through the power line 132 when an abnormal condition occurs. In an embodiment, the power supply unit 104 is connected to the pin 3 of the charge controller 110 and the power line 132 is connected to the pin 8 of the charge controller 110. In an embodiment, the pin 3 and the pin 8 of the charge controller 110 are removably connected to each other. Thus, in an embodiment, power from the power supply unit 104 flows from the pin 3 of the charge controller 110, to the pin 8 of the charge controller 110, to the power line 132, and to the electronic device 102.

However, in an embodiment, the charge controller 110 includes a current sensor configured to detect a current being output to the power line 132. When the current being output to the power line 132 exceeds a predetermined maximum current threshold, the charge controller 110 can interrupt the power being supplied to the power line 132 by disconnecting the pin 3 and the pin 8 of the charge controller 110. Since the pin 3 and the pin 8 of the charge controller 110 are disconnected, current flowing from the power supply unit 104 to the power line 132 using the charge controller 110 is reduced or eliminated. Thus, the power in the power line 132 is reduced or eliminated. In an embodiment, this can cause a circuit break between the power supply unit 104 and the power line 132.

In an embodiment, the charge controller 110 disconnects the pin 3 and the pin 8 of the charge controller 110 for a predetermined amount of time. After the predetermined amount of time has expired, the charge controller 110 can reconnect the pin 3 and the pin 8 of the charge controller 110. However, if the current detected by the current sensor exceeds the predetermined maximum current threshold, the charge controller 110 can disconnect the pin 3 and the pin 8 of the charge controller 110 again. In an embodiment, the predetermined amount of time can be fixed. In an embodiment, the predetermined amount of time can be varied depending on when the pin 3 and the pin 8 of the charge controller 110 were last disconnected. In an embodiment, the predetermined amount of time is set such that potential damage to the electronic device 102 is minimized or reduced. In an embodiment, the charge controller 110 can also disconnect the pin 3 and the pin 8 of the charge controller 110 until a determination is made that the electronic device 102 has disconnected and reconnected to the storage system 100.

In an embodiment, the charge controller 110 comprises a temperature sensor. When the temperature of the charge controller 110 exceeds a predetermined maximum temperature threshold, the charge controller 110 can similarly disconnect the pin 3 and the pin 8 of the charge controller 110.

In an embodiment shown in FIG. 2, the charge controller 110 receives the ENABLE signal at an ENABLE signal line 128. The ENABLE signal line 128 feeds the ENABLE signal to the pin 5 of the charge controller 110. In an embodiment, the ENABLE signal can disconnect or connect the pin 3 to the pin 8 in the charge controller 110. In an embodiment, this can cut off power to the power line 132 and the electronic device 102 or allow for the supply of power to the power line 132 and the electronic device 102. In an embodiment, the charge controller 110 is activated or deactivated by the ENABLE signal. In an embodiment, the ENABLE signal is controlled by the host controller 108. Thus, in an embodiment, the host controller 108 can control when the pin 3 and the pin 8 of the charge controller 110 are disconnected or connected. In an embodiment, the host controller 108 can also control when the charge controller 110 is activated or deactivated.

Figure 4:
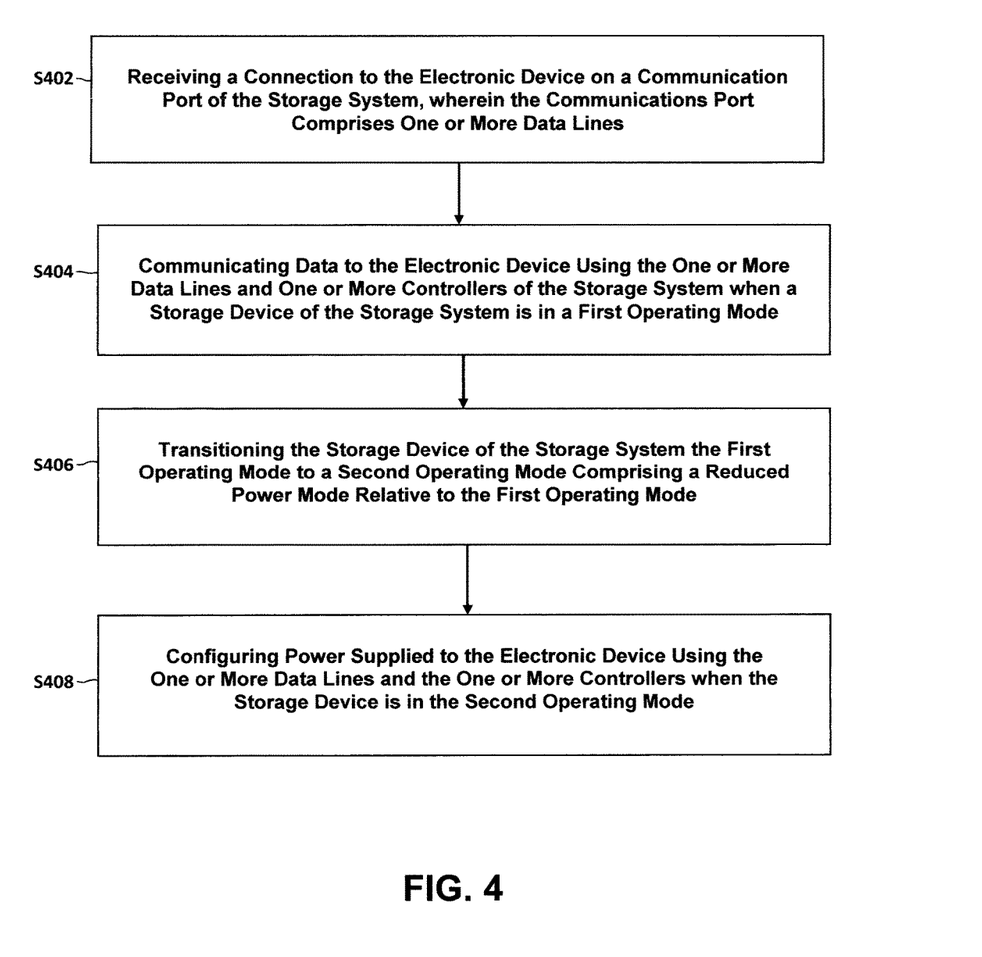
FIG. 4 depicts a process for charging an electronic device using a storage system according to an embodiment.

In an embodiment, a process for charging an electronic device 102 using the storage system 100 is shown in FIG. 4. In block S402, a connection to the electronic device 102 is received on the communications port 114 of the storage system 100. As seen in the embodiment shown in FIG. 2, the communications port 114 comprises one or more data lines such as the data lines 138 and 140. In block S404, data is communicated to the electronic device 102 using one or more of the data lines 138 and 140 when the storage device 112 of the storage system 100 is in the first operating mode.

In block S406, the storage device 112 transitions from the first operating mode to the second operating mode. As previously noted, the second operating mode comprises a reduced power mode relative to the first operating mode. In block S408, the power supplied to the electronic device 102 is configured using one or more of the data lines 138 and 140 and one or more controllers when the storage device 112 is in the second operating mode. In an embodiment, the one or more controllers comprise the host controller 108, the charge controller 110, or any combination thereof.

Figure 5:
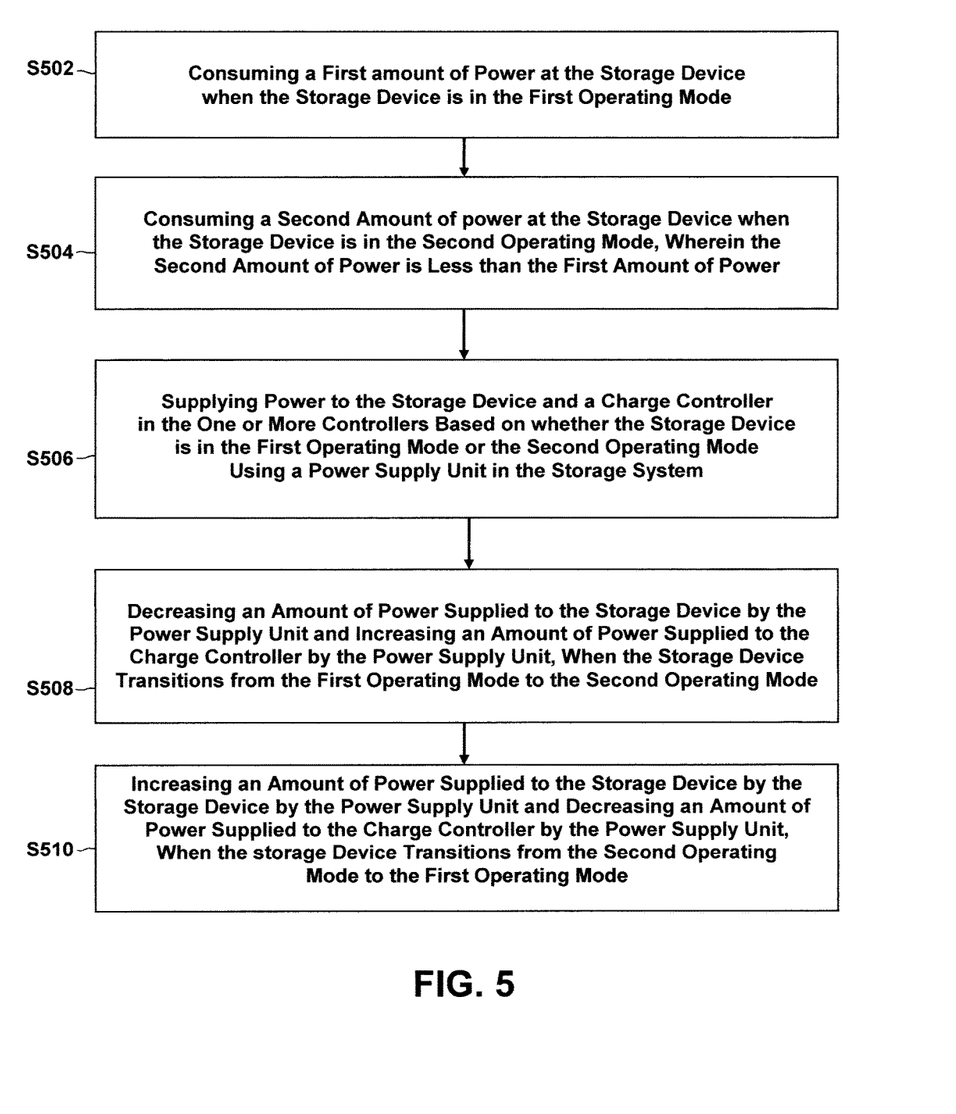
FIG. 5 depicts one or more optional blocks for a process for charging an electronic device using a storage system according to an embodiment.

In an embodiment, additional or optional blocks in the process for charging the electronic device 102 using the storage system 100 are shown in FIG. 5. In block S502, the storage device 112 consumes the first amount of power when the storage device 112 is in the first operating mode. In block S504, the storage device 112 consumes the second amount of power when the storage device 112 is in the second operating mode. As previously noted, the second amount of power is less than the first amount of power.

In block S506, power is supplied by the power supply unit 104 to the storage device 112 and the charge controller 110 based on whether the storage device 112 is in the first operating mode or the second operating mode. In block S508, an amount of power supplied to the storage device 112 by the power supply unit 104 is decreased and an amount of power supplied to the charge controller 110 by the power supply unit 104 is increased when the storage device 112 transitions from the first operating mode to the second operating mode. In block S510, an amount of power supplied to the storage device 112 by the power supply unit 104 is increased, and an amount of power supplied to the charge controller 110 is decreased when the storage device 112 transitions from the second operating mode to the first operating mode.

Figure 6:
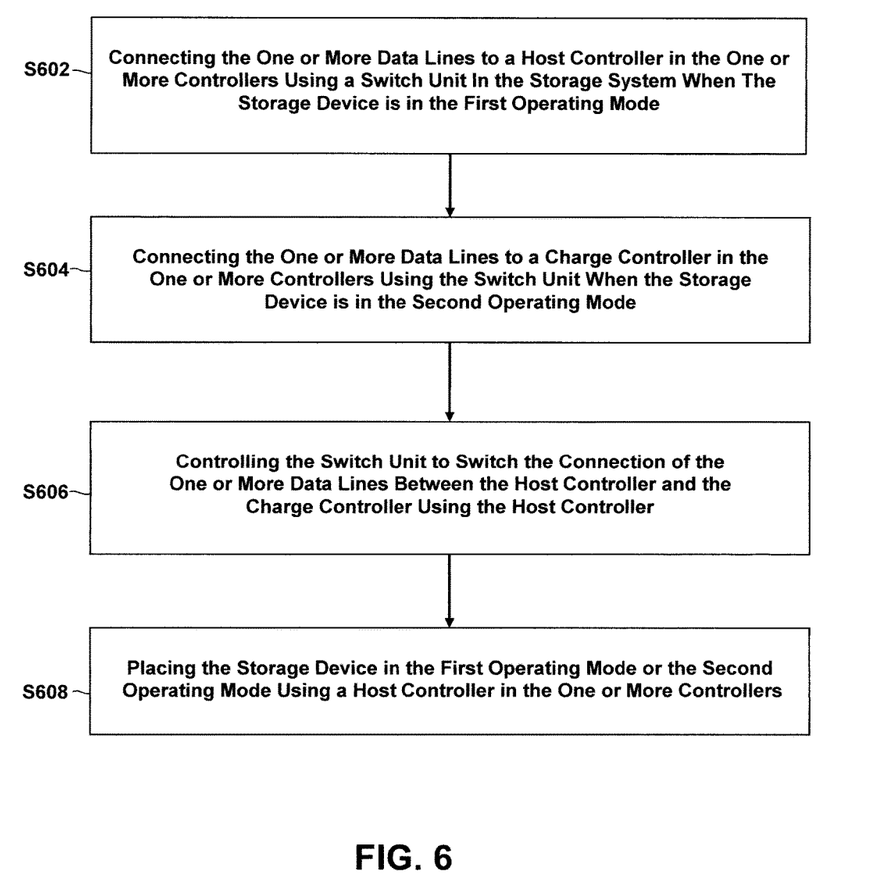
FIG. 6 depicts one or more optional blocks for a process for charging an electronic device using a storage system according to an embodiment.

In an embodiment, additional or optional blocks in the process for charging the electronic device 102 using the storage system 100 are shown in FIG. 6. In block S602, one or more data lines such as the data lines 138 and 140 are connected to the host controller 108 using the switch unit 106 when the storage device 112 is in the first operating mode.

In block S604, one or more data lines such as the data lines 138 and 140 are connected to the charge controller 110 when the storage device 112 is in the second operating mode. In block S606, the host controller 108 controls the switch unit 106 to switch the connection of the one or more data lines between the host controller 108 and the charge controller 110. In block S608, the host controller 108 places the storage device 112 in the first operating mode or the second operating mode.

Figure 7:
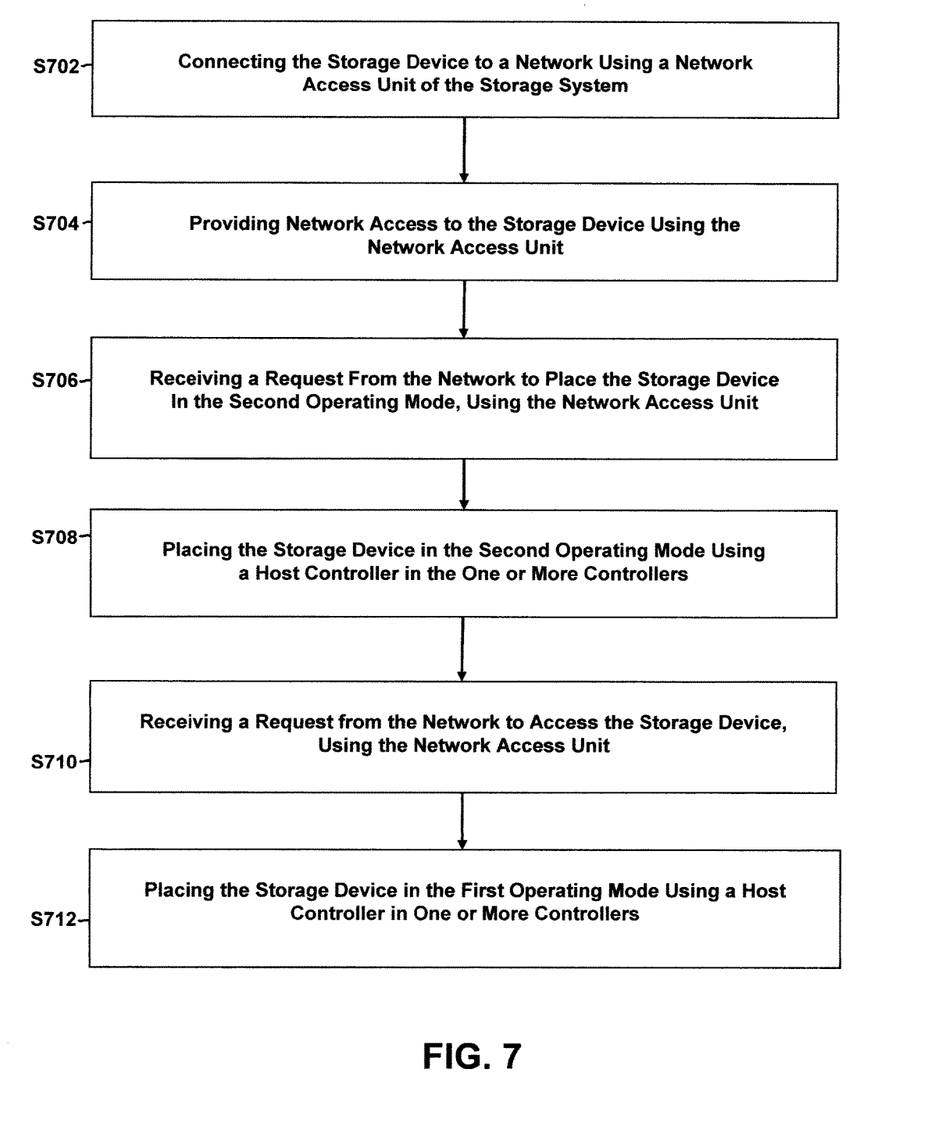
FIG. 7 depicts one or more optional blocks for a process for charging an electronic device using a storage system according to an embodiment.

In an embodiment, additional or optional blocks in the process for charging the electronic device 102 using the storage system 100 are shown in FIG. 7. In block S702, the storage device 112 is connected to the network using the network access unit 130. In block S704, the network access unit 130 provides network access to the storage device 112.

In block S706, the network access unit 130 receives a request from the network to place the storage device 112 in the second operating mode. In block S708, the host controller 108 places the storage device 112 in the second operating mode. In an embodiment, the host controller 108 places the storage device 112 in the second operating mode in response to the request to place the storage device 112 in the second operating mode. For example, the electronic device 102 may wish to be charged. In such a case, the electronic device 102 may force the storage device 112 to be placed into the second operating mode (e.g., standby/off mode) in order to begin charging the electronic device 102 instead of waiting for the storage system 100 to determine when the electronic device 102 should be charged. In an embodiment, additional or other electronic devices aside from the electronic device 102 may force the storage device 112 to be placed into the second operating mode.

In block S710, the network access unit 130 receives a request from the network to access the storage device 112. In block S712, the host controller 108 places the storage device 112 in the first operating mode. In an embodiment, the host controller 108 places the storage device 112 in the first operating mode in response to the request from the network to access the storage device 112. For example, should another electronic device wish to access the storage device 112, the host controller 108 may transition the storage device 112 from the second operating mode (e.g., standby/off mode) to the first operating mode. Thus, in an embodiment, the access of the storage device 112 may be prioritized over the charging of the electronic device 102.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A storage system comprising:
a storage device comprising a medium configured to store data, wherein the storage device is configured to be in a first operating mode or a second operating mode comprising a reduced power mode relative to the first operating mode;
a communications port configured to connect to an electronic device, the communications port comprising one or more data lines configured to communicate data to the electronic device and to configure power supplied to the electronic device; and
one or more controllers configured to:
control an operation of the storage device;
communicate data to the electronic device using the one or more data lines when the storage device is in the first operating mode; and
configure power supplied to the electronic device using the one or more data lines when the storage device is in the second operating mode, wherein a larger amount of power is supplied to the electronic device when the storage device is in the second operating mode than when the storage device is in the first operating mode;
a first amount of power is diverted from the storage device to the electronic device when the storage device is in the second operating mode; and
the storage system lacks sufficient power to supply the larger amount of power to the electronic device when the storage device is in the first operating mode.

2. The storage system of claim 1 wherein when the storage device is in the second operating mode, the storage device is in a standby mode or an off mode.

3. The storage system of claim 1 wherein:
the storage device is configured to consume the first amount of power when the storage device is in the first operating mode and a second amount of power when the storage device is in the second operating mode; and
the second amount of power is less than the first amount of power.

4. The storage system of claim 1 wherein the one or more controllers comprise:
a host controller configured to communicate data to the electronic device and control the operation of the storage device; and
a charge controller configured to supply power to the electronic device.

5. The storage system of claim 4 further comprising a switch unit configured to switch a connection of the one or more data lines between the host controller and the charge controller, wherein:
the host controller is further configured to communicate data to the electronic device using the one or more data lines when the one or more data lines are connected to the host controller; and
the charge controller is further configured to configure power supplied to the electronic device when the one or more data lines are connected to the charge controller.

6. The storage system of claim 5 wherein the host controller is further configured to control the switch unit to switch the connection of the one or more data lines between the host controller and the charge controller.

7. The storage system of claim 4 further comprising a power supply unit configured to supply power to the storage device and the charge controller, based on whether the storage device is in the first operating mode or the second operating mode.

8. The storage system of claim 7 wherein the power supply unit is further configured to decrease an amount of power supplied to the storage device and increase an amount of power supplied to the charge controller, when the storage device transitions from the first operating mode to the second operating mode.

9. The storage system of claim 7 wherein the power supply unit is further configured to increase an amount of power supplied to the storage device and decrease an amount of power supplied to the charge controller, when the storage device transitions from the second operating mode to the first operating mode.

10. The storage system of claim 4 wherein the host controller is further configured to place the storage device in the first operating mode or the second operating mode.

11. The storage system of claim 4 further comprising a network access unit configured to:
be connected to a network;
provide network access to the storage device;

receive a request from the network to place the storage device in the second operating mode; and
receive a request from the network to access the storage device.

12. The storage system of claim 11 wherein the host controller is further configured to:
place the storage device in the second operating mode responsive to the network access unit receiving the request from the network to place the storage device in the second operating mode; and
place the storage device in the first operating mode responsive to the network access unit receiving the request from the network to access the storage device.

13. A method for charging an electronic device using a storage system, the method comprising:
establishing a connection to the electronic device on a communications port of the storage system, wherein the communications port comprises one or more data lines;
communicating data to the electronic device using the one or more data lines and one or more controllers of the storage system when a storage device of the storage system is in a first operating mode;
transitioning the storage device of the storage system from the first operating mode to a second operating mode comprising a reduced power mode relative to the first operating mode; and
configuring power supplied to the electronic device using the one or more data lines and the one or more controllers when the storage device is in the second operating mode, wherein: a larger amount of power is supplied to the electronic device when the storage device is in the second operating mode than when the storage device is in the first operating mode;
a first amount of power is diverted from the storage device to the electronic device when the storage device is in the second operating mode:
the storage system lacks sufficient power to supply the larger amount of power to the electronic device when the storage device is in the first operating mode.

14. The method of claim 13 further comprising:
consuming a second amount of power at the storage device when the storage device is in the first operating mode; and
consuming a third amount of power at the storage device when the storage device is in the second operating mode, wherein the third amount of power is less than the second amount of power.

15. The method of claim 13 further comprising:
supplying, using a power supply unit in the storage system, power to the storage device and a charge controller in the one or more controllers based on whether the storage device is in the first operating mode or the second operating mode.

16. The method of claim 15 further comprising decreasing an amount of power supplied to the storage device by the power supply unit and increasing an amount of power supplied to the charge controller by the power supply unit, when the storage device transitions from the first operating mode to the second operating mode.

17. The method of claim 15 further comprising increasing an amount of power supplied to the storage device by the power supply unit and decreasing an amount of power supplied to the charge controller by the power supply unit, when the storage device transitions from the second operating mode to the first operating mode.

18. The method of claim 13 further comprising:
connecting the one or more data lines to a host controller in the one or more controllers using a switch unit in the storage system when the storage device is in the first operating mode; and
connecting the one or more data lines to a charge controller in the one or more controllers using the switch unit when the storage device is in the second operating mode.

19. The method of claim 18 further comprising:
controlling, using the host controller, the switch unit to switch the connection of the one or more data lines between the host controller and the charge controller.

20. The method of claim 13 further comprising placing the storage device in the first operating mode or the second operating mode, using a host controller in the one or more controllers.

21. The method of claim 13 further comprising:
connecting the storage device to a network using a network access unit of the storage system; and
providing network access to the storage device using the network access unit.

22. The method of claim 21 further comprising:
receiving a request from the network to place the storage device in the second operating mode, using the network access unit; and
placing the storage device in the second operating mode using a host controller in the one or more controllers.

23. The method of claim 21 further comprising:
receiving a request from the network to access the storage device, using the network access unit; and
placing the storage device in the first operating mode using a host controller in the one or more controllers.

24. A network attached storage system configured to be connected to a network and to charge an electronic device, the network attached storage system comprising:
a storage device comprising a medium configured to store data, wherein the storage device is configured to be in a first operating mode or a second operating mode comprising a reduced power mode relative to the first operating mode;
a communications port configured to connect to the electronic device, the communications port comprising one or more data lines configured to communicate data to the electronic device and to supply power to the electronic device;
one or more controllers configured to:
control an operation of the storage device;
communicate data to the electronic device using the one or more data lines when the storage device is in the first operating mode; and
configure power supplied to the electronic device using the one or more data lines when the storage device is in the second operating mode, wherein:
a larger amount of power is supplied to the electronic device when the storage device is in the second operating mode than when the storage device is in the first operating mode;
a first amount of power is diverted from the storage device to the electronic device when the storage device is in the second operating mode; and
the network attached storage system lacks sufficient power to supply the larger amount of power to the electronic device when the storage device is in the first operating mode; and a network access unit configured to:
  be connected to a network;
  provide network access to the storage device;
  receive a request from the network to place the storage device in the second operating mode; and
  receive a request from the network to access the storage device.

25. The network attached storage system of claim 24 wherein the one or more controllers comprise:
  a host controller configured to communicate data to the electronic device and control the operation of the storage device, wherein the host controller is configured to place the storage device in the first operating mode or the second operating mode; and
  a charge controller configured to supply power to the electronic device.

26. The network attached storage system of claim 25 wherein the host controller is further configured to:
  place the storage device in the second operating mode responsive to the network access unit receiving the request from the network to place the storage device in the second operating mode; and
  place the storage device in the first operating mode responsive to the network access unit receiving the request from the network to access the storage device.

27. The network attached storage system of claim 25 further comprising a switch unit configured to switch a connection of the one or more data lines between the host controller and the charge controller, wherein:
  the host controller is further configured to communicate data to the electronic device using the one or more data lines when the one or more data lines are connected to the host controller; and
  the charge controller is further configured to configure power supplied to the electronic device when the one or more data lines are connected to the charge controller.

28. The network attached storage system of claim 27 wherein the switch unit is further configured to:
  connect the one or more data lines to the host controller when the storage device is in the first operating mode; and
  connect the one or more data lines to the charge controller when the storage device is in the second operating mode.

29. The network attached storage system of claim 25 further comprising a power supply unit configured to supply power to the storage device and the charge controller, based on whether the storage device is in the first operating mode or the second operating mode.

30. The network attached storage system of claim 29 wherein the power supply unit is further configured to decrease an amount of power supplied to the storage device and increase an amount of power supplied to the charge controller, when the storage device transitions from the first operating mode to the second operating mode.

31. The network attached storage system of claim 29 wherein the power supply unit is further configured to increase an amount of power supplied to the storage device and decrease an amount of power supplied to the charge controller, when the storage device transitions from the second operating mode to the first operating mode to the first operating mode.

* * * * *